US011465509B2

(12) United States Patent
Kinoshita

(10) Patent No.: US 11,465,509 B2
(45) Date of Patent: Oct. 11, 2022

(54) VEHICLE CONTROL APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 185 days.

(21) Appl. No.: 16/169,556

(22) Filed: Oct. 24, 2018

(65) Prior Publication Data

US 2019/0232789 A1 Aug. 1, 2019

(30) Foreign Application Priority Data

Jan. 26, 2018 (JP) ............................. JP2018-011406

(51) Int. Cl.
   *B60L 7/18* (2006.01)
   *B60T 8/172* (2006.01)
   (Continued)

(52) U.S. Cl.
   CPC ...... *B60L 7/18* (2013.01); *B60L 7/16* (2013.01); *B60T 8/172* (2013.01);
   (Continued)

(58) Field of Classification Search
   CPC ... B60L 7/18; B60L 7/16; B60T 8/172; F02D 29/02; B60W 30/18127
   See application file for complete search history.

(56) References Cited

U.S. PATENT DOCUMENTS 6,283,561 B1 * 9/2001 Shimizu .................... B60T 7/12
                                                  303/155
6,424,904 B1 * 7/2002 Takahashi .......... B60K 31/0083
                                                  340/441

(Continued)

FOREIGN PATENT DOCUMENTS

JP         11-227584 A      8/1999
JP       2010-254259 A     11/2010

(Continued)

OTHER PUBLICATIONS

Japanese Notice of Reasons for Refusal issued in corresponding Japanese Patent Application No. 2018-011406, dated Jul. 16, 2019, with English translation.

*Primary Examiner* — Thomas Ingram
(74) *Attorney, Agent, or Firm* — McDermott Will & Emery LLP

(57) ABSTRACT

A vehicle control apparatus includes a generator, a brake system, first and second sensors, first and second deceleration rate setting units, and a power generation torque controller. The first deceleration rate setting unit sets, when a first control mode that decelerates a vehicle on the basis of a brake operation performed by an occupant is executed, an allowable deceleration rate upon deceleration of the vehicle on the basis of a brake operation amount. The second deceleration rate setting unit sets, when a second control mode that decelerates the vehicle on the basis of a situation ahead of the vehicle is executed, the allowable deceleration rate upon deceleration of the vehicle on the basis of a brake fluid pressure. The power generation torque controller controls power generation torque of the generator on the basis of the allowable deceleration rate that is set by the first or second deceleration rate setting unit.

13 Claims, 10 Drawing Sheets

(51) Int. Cl.
  *F02D 29/02* (2006.01)
  *B60L 7/16* (2006.01)
  *B60W 30/18* (2012.01)
  *B60L 58/12* (2019.01)
  *B60T 8/171* (2006.01)
  *B60T 8/1755* (2006.01)
  *B60W 10/08* (2006.01)
  *F02D 29/06* (2006.01)

(52) U.S. Cl.
  CPC ....... *B60W 30/18127* (2013.01); *F02D 29/02* (2013.01); *B60L 58/12* (2019.02); *B60T 8/171* (2013.01); *B60T 8/1755* (2013.01); *B60T 2220/04* (2013.01); *B60T 2270/604* (2013.01); *B60W 10/08* (2013.01); *B60Y 2300/18125* (2013.01); *F02D 29/06* (2013.01)

(56) References Cited

U.S. PATENT DOCUMENTS

| | | | | |
|---|---|---|---|---|
| 6,606,548 | B2 * | 8/2003 | Kato | B60T 8/172 303/900 |
| 8,556,353 | B2 * | 10/2013 | Ishii | B60T 8/267 303/152 |
| 8,798,870 | B2 | 8/2014 | Kamiya et al. | |
| 8,998,352 | B2 | 4/2015 | Imamura | |
| 2003/0184155 | A1 * | 10/2003 | Crombez | B60L 7/12 303/152 |
| 2005/0218717 | A1 * | 10/2005 | Nishina | B60W 20/13 303/152 |
| 2007/0029963 | A1 * | 2/2007 | Iura | H02P 23/20 318/811 |
| 2007/0106448 | A1 * | 5/2007 | Minowa | B60W 10/06 701/96 |
| 2009/0051304 | A1 * | 2/2009 | Muta | B60L 7/26 903/947 |
| 2012/0136547 | A1 * | 5/2012 | Miyazaki | B60T 8/4081 701/70 |
| 2013/0154344 | A1 | 6/2013 | Imamura | |
| 2013/0245877 | A1 * | 9/2013 | Ferguson | G08G 1/167 701/23 |
| 2013/0289830 | A1 | 10/2013 | Kamiya et al. | |
| 2015/0039198 | A1 | 2/2015 | Takeuchi et al. | |
| 2015/0183411 | A1 * | 7/2015 | Sakurazawa | B60T 7/042 303/3 |
| 2016/0009272 | A1 * | 1/2016 | Tanaka | B60W 10/30 701/22 |
| 2016/0267726 | A1 | 9/2016 | Soo et al. | |
| 2018/0297475 | A1 * | 10/2018 | Zhao | B60L 7/26 |
| 2019/0001942 | A1 * | 1/2019 | Spieker | B60T 8/171 |

FOREIGN PATENT DOCUMENTS

| | | |
|---|---|---|
| JP | 2012-086773 A | 5/2012 |
| JP | 2013-071549 A | 4/2013 |
| JP | 2014-236567 A | 12/2014 |
| JP | 2015-116085 A | 6/2015 |
| WO | 2012/063572 A1 | 5/2012 |
| WO | 2012/090924 A1 | 7/2012 |
| WO | 2013/125049 A1 | 8/2013 |
| WO | 2015/087516 A2 | 6/2015 |

* cited by examiner

VEHICLE CONTROL APPARATUS

CROSS-REFERENCE TO RELATED APPLICATIONS

The present application claims priority from Japanese Patent Application No. 2018-011406 filed on Jan. 26, 2018, the entire contents of which are hereby incorporated by reference.

BACKGROUND

The technology relates to a vehicle control apparatus that enables energy regeneration upon vehicle deceleration.

A vehicle including an automobile is provided with an electric power generator such as a motor generator, an alternator, or an integrated starter generator (ISG). These generators are controlled into an electric power-generation state with use of engine power. Further, in terms of improving energy efficiency of the vehicle, these generators are also controlled into the electric power-generation state upon vehicle deceleration during which fuel supply to the engine is limited. For example, reference is made to Japanese Unexamined Patent Application Publication No. 2015-116085, and International Publication Nos. WO2012/090924, and WO2012/063572.

SUMMARY

An aspect of the technology provides a vehicle control apparatus that includes an electric power generator, an electric power generator coupled to a wheel of a vehicle via a power transmission path; a brake system that includes a brake operation device, a wheel braking device, and a fluid pressure device, in which the brake operation device is configured to be operated by an occupant of the vehicle, the wheel braking device is configured to put brake on the wheel, and the fluid pressure device is configured to control a pressure of a brake fluid to be supplied to the wheel braking device; a first sensor configured to detect a brake operation amount that is an amount of a brake operation of the brake operation device; a second sensor configured to detect a brake fluid pressure that is the pressure of the brake fluid; a first deceleration rate setting unit configured to set an allowable deceleration rate on the basis of the brake operation amount when a first control mode is to be executed, in which the first control mode decelerates the vehicle on the basis of the brake operation performed by the occupant, and the allowable deceleration rate is a deceleration rate that is allowable upon deceleration of the vehicle; a second deceleration rate setting unit configured to set an allowable deceleration rate on the basis of the brake fluid pressure when a second control mode is to be executed, in which the second control mode decelerates the vehicle on the basis of a situation ahead of the vehicle, and the allowable deceleration rate is a deceleration rate that is allowable upon the deceleration of the vehicle; and an electric power generation torque controller configured to control power generation torque of the electric power generator on the basis of the allowable deceleration rate that is set by one of the first deceleration rate setting unit and the second deceleration rate setting unit.

An aspect of the technology provides a vehicle control apparatus that includes: an electric power generator coupled to a wheel of a vehicle via a power transmission path; a brake system that includes a brake operation device, a wheel braking device, and a fluid pressure device, in which the brake operation device is configured to be operated by an occupant of the vehicle, the wheel braking device is configured to put brake on the wheel, and the fluid pressure device is configured to control a pressure of a brake fluid to be supplied to the wheel braking device; a first sensor configured to detect a brake operation amount that is an amount of a brake operation of the brake operation device; a second sensor configured to detect a brake fluid pressure that is the pressure of the brake fluid; and circuitry configured to set an allowable deceleration rate on the basis of the brake operation amount when a first control mode is to be executed, in which the first control mode decelerates the vehicle on the basis of the brake operation performed by the occupant, and the allowable deceleration rate is a deceleration rate that is allowable upon deceleration of the vehicle, and set an allowable deceleration rate on the basis of the brake fluid pressure when a second control mode is to be executed, in which the second control mode decelerates the vehicle on the basis of a situation ahead of the vehicle, and the allowable deceleration rate is a deceleration rate that is allowable upon the deceleration of the vehicle; and a controller configured to control power generation torque of the electric power generator on the basis of the allowable deceleration rate.

DETAILED DESCRIPTION

Figure 1:
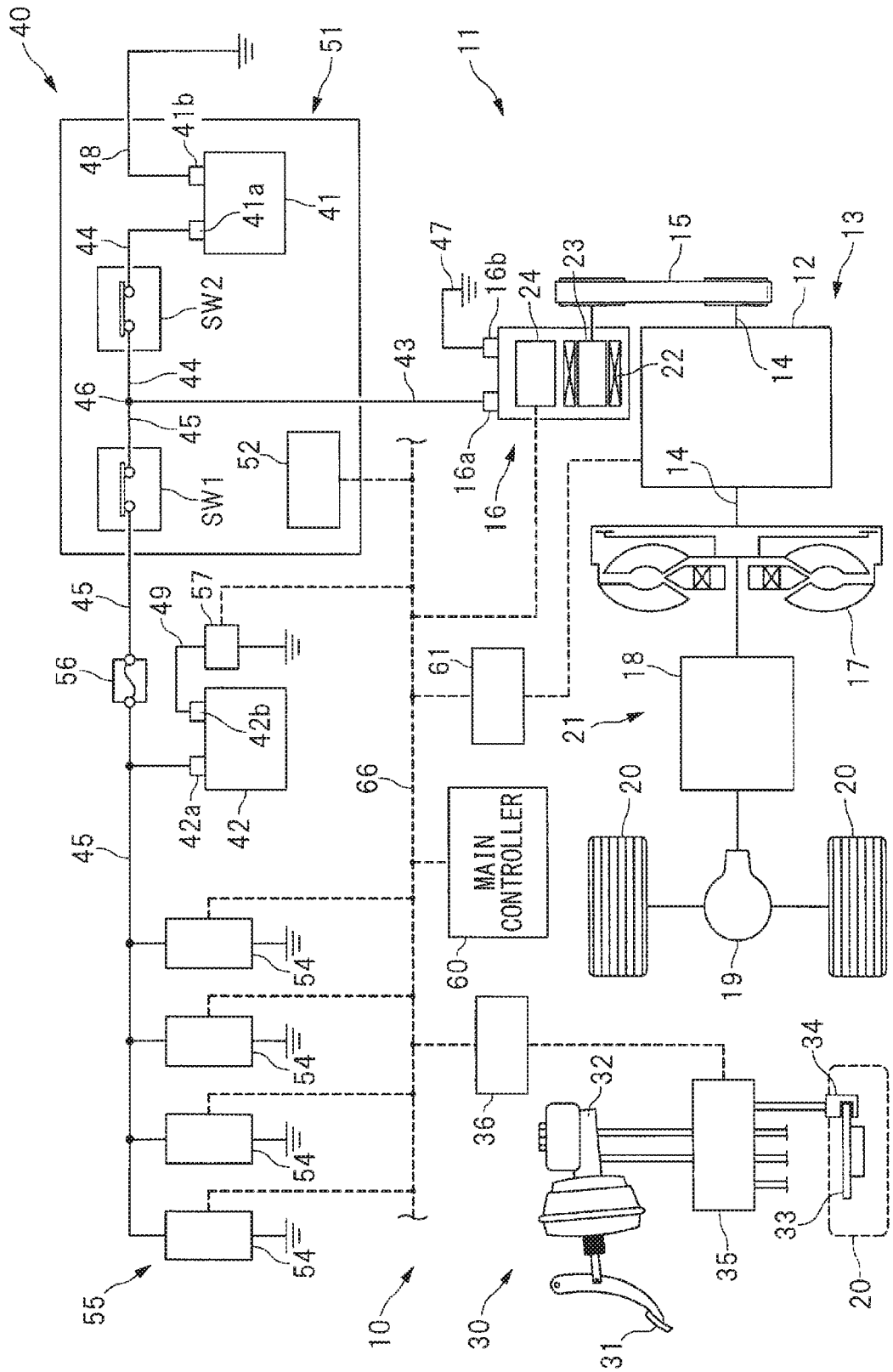
FIG. 1 is a schematic view of a configuration example of a vehicle including a vehicle control apparatus according to an example implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Systems including a cruise control system has been developed as driver-assist systems or automatic driving systems of a vehicle. The cruise control system may allow an own vehicle to follow a preceding vehicle. The cruise control system may use a millimeter wave radar, a camera, or other equipment to collect information relating to a situation ahead of the vehicle. When the own vehicle moves close to the preceding vehicle, the cruise control system may automatically decelerate the vehicle to keep a distance between the own vehicle and the preceding vehicle. In other words, the cruise control system may automatically decelerate the vehicle in accordance with the situation ahead of the vehicle, without any operation of a brake pedal performed by an occupant. Upon such a vehicle deceleration as well, causing an electric power generator to actively generate electricity may be demanded. However, it has been difficult to appropriately control electric power generation torque to thereby prevent the occupant from experiencing a feeling of strangeness when the brake pedal is not operated by the occupant.

It is desirable to appropriately control electric power generation torque of an electric power generator.

[Vehicle Configuration]

FIG. 1 is a schematic view of a configuration example of a vehicle 11 including a vehicle control apparatus 10 according to an example implementation of the technology. Referring to FIG. 1, the vehicle 11 may include a power unit 13. The power unit 13 may include an engine 12 that serves as a power source. The engine 12 may include a crankshaft 14 that is mechanically coupled to a starter generator 16 via a belt mechanism 16. The engine 12 may also be coupled to a transmission mechanism 18 via a torque converter 17. The transmission mechanism 18 may be coupled to wheels 20 via a member such as a differential mechanism 19. In other words, the starter generator 16 and the wheels 20 may be coupled to each other via a power transmission path 21. The power transmission path 21 may include the torque converter 17, the transmission mechanism 18, and other members. In one implementation, the starter generator 16 may serve as an "electric power generator".

The starter generator 16 coupled to the engine 12 may be a so-called integrated starter generator (ISG) that serves as an electric power generator and/or an electric motor, in accordance with situations. The starter generator 16 may include a stator 22 having a stator coil and a rotor 23 having a field coil. The starter generator 16 may further include an ISG controller 24 in order to control a conducting state of each of the stator coil and the field coil. The ISG controller 24 may include components such as an inverter, a regulator, and a microcomputer. The ISG controller 24 may control the conducting state of each of the field coil and the stator coil, thus making it possible to control a generated voltage, electric power generation torque, powering torque, and/or other factor, of the starter generator 16. In one implementation, the ISG controller 24 may serve as an "electric power generation torque controller".

The vehicle 11 may include a brake 30 that puts the brakes on the wheels 20. The brake 30 may include a brake pedal 31, a master cylinder 32, a disc rotor 33, and a caliper 34. The brake pedal 31 may be operated by an occupant. The master cylinder 32 may increase a pressure of a brake fluid in accordance with an amount of operation of the brake pedal 31. The pressure of the brake fluid may be hereinafter referred to as a brake fluid pressure. The disc rotor 33 may be fixed to each of the wheels 20. The caliper 34 may put the brakes on the disc rotor 33. In one implementation, the brake 30 may serve as a "brake system". In one implementation, the brake pedal 31 may serve as a "brake operation device". In one implementation, the caliper may serve as a "wheel braking device".

The brake 30 may further include an actuator 35. The actuator 35 may be provided between the master cylinder 32 and the caliper 34. The actuator 35 may control the brake fluid pressure to be supplied to the caliper 34. The actuator 35 may include unillustrated devices including an electric pump, an accumulator, and an electromagnetic valve. The actuator 35 may be further coupled to a brake controller 36 in order to control an operating state of each of components such as the electric pump or the electromagnetic valve and thereby to control the brake fluid pressure supplied to the caliper 34. The brake controller 36 may include, for example, a microcomputer. In one implementation, the actuator 35 may serve as a "fluid pressure device".

A control mode upon operating the brake 30 to decelerate the vehicle 11 may include a manual mode and an automatic mode. The manual mode may be a control mode that decelerates the vehicle 11 on the basis of a brake operation performed by the occupant. The automatic mode may be a control mode that decelerates the vehicle 11 on the basis of a situation ahead of the vehicle 11. The vehicle 11 may have a follow-up cruise control function, which is one of the driver-assist functions and the automatic driving functions that automatically control a vehicle speed. The follow-up cruise control may include so-called adaptive cruise control. The follow-up cruise control function may keep a constant distance between the own vehicle 11 and the preceding vehicle. During the follow-up cruise control being executed, the brake 30 may be controlled in the automatic mode. Thus, the vehicle 11 may be automatically decelerated on the basis of the situation ahead of the vehicle 11. In contrast, during the follow-up cruise control being stopped, the brake 30 may be controlled in the manual mode. Thus, the vehicle 11 may be decelerated on the basis of the brake operation performed by the occupant. In one implementation, the manual mode may serve as a "first control mode". In one implementation, the automatic mode may serve as a "second control mode".

In other words, during the manual mode being executed, i.e. during the follow-up cruise control being stopped, when the occupant presses down on the brake pedal 31, the brake fluid pressure outputted from the master cylinder 32 may be transmitted to the caliper 34 via the actuator 35. Thereafter, the caliper 34 may put brakes on the disc rotor 33 of a corresponding one of the wheels 20 in accordance with the brake fluid pressure. In contrast, during the automatic mode being executed, i.e., during the follow-up cruise control being executed, the brake fluid pressure may be outputted from the actuator 35 to the caliper 34 in accordance with the situation ahead of the vehicle 11. Thereafter, the caliper 34 may put brakes on the disc rotor 33 of a corresponding one of the wheels 20 in accordance with the brake fluid pressure. For example, when the own vehicle 11 moves close to the preceding vehicle, the brake fluid pressure may be outputted from the actuator 35 to the caliper 34, and the caliper 34 may put brakes on the wheels 20 in order to automatically decelerate the own vehicle 11 to thereby keep the distance between the own vehicle 11 and the preceding vehicle.

[Power Supply Circuit]

Figure 2:
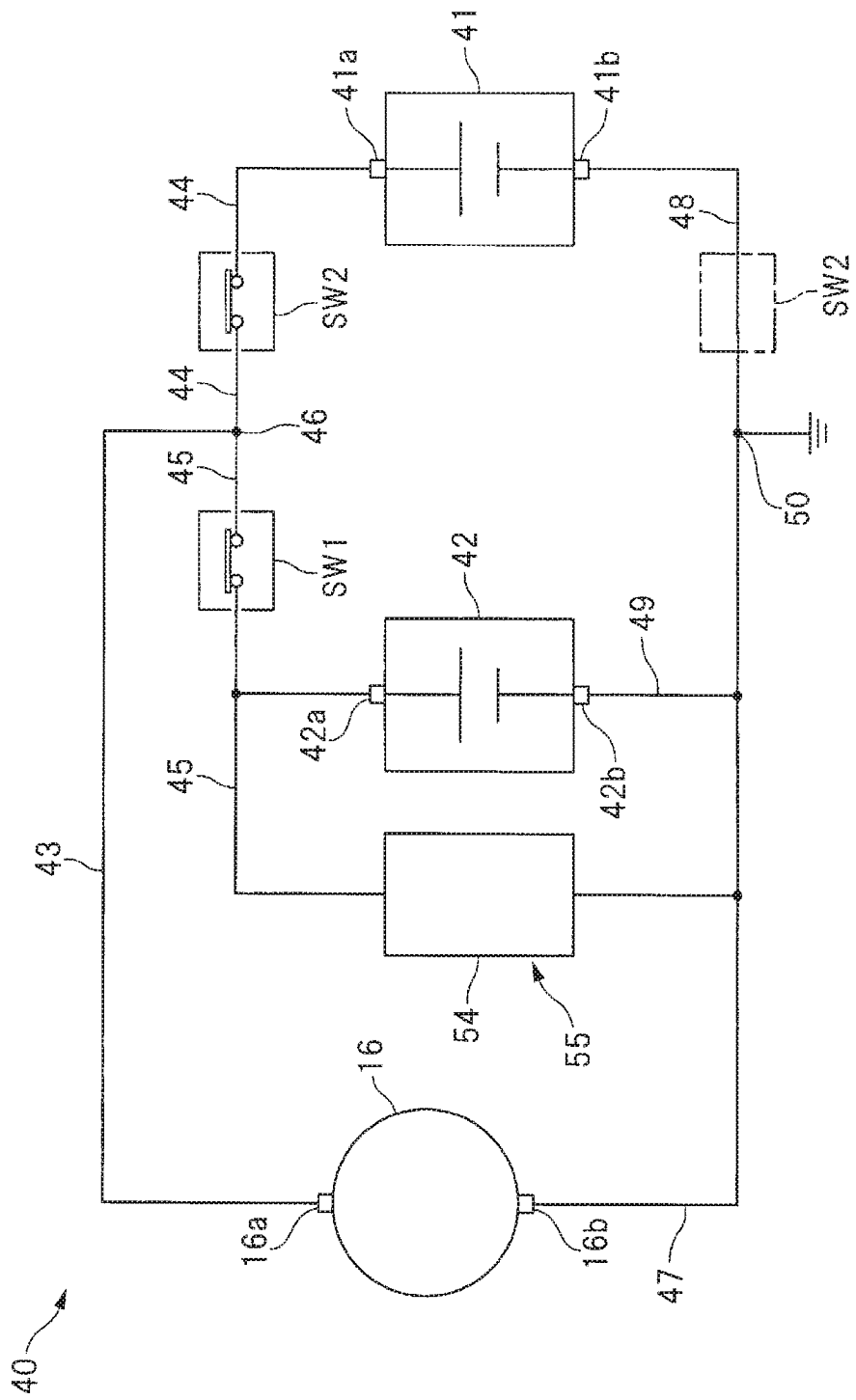
FIG. 2 is a circuit diagram schematically illustrating an example of a power supply circuit illustrated in FIG. 1.

A description is given of a power supply circuit 40 included in the vehicle 11. FIG. 2 is a circuit diagram schematically illustrating an example of the power supply circuit 40. Referring to FIG. 2, the power supply circuit 40 may include a lithium-ion battery 41 and a lead-acid battery 42. The lithium-ion battery 41 and the lead-acid battery 42 may be coupled to each other in parallel, and may be electrically coupled to the starter generator 16. The lithium-ion battery 41 may have a terminal voltage that is designed higher than a terminal voltage of the lead-acid battery 42 in order to actively discharge the lithium-ion battery 41. Further, the lithium-ion battery 41 may have internal resistance that is designed smaller than internal resistance of the lead-acid battery 42 in order to actively charge and discharge the lithium-ion battery 41.

The starter generator 16 may include a positive terminal 16a coupled to a positive line 43. The lithium-ion battery 41 may include a positive terminal 41a coupled to a positive line 44. The lead-acid battery 42 may include a positive terminal 42a coupled to a positive line 45. These positive lines 43 to 45 may be coupled to one another via a node 46. The starter generator 16 may also include a negative terminal 16b coupled to a negative line 47. The lithium-ion battery 41 may include a negative terminal 41b coupled to a negative line 48. The lead-acid battery 42 may include a negative terminal 42b coupled to a negative line 49. These negative lines 47 to 49 may be coupled to one another via a reference potential point 50.

The positive line 45 of the lead-acid battery 42 may be provided with a switch SW1 that is switchable between an electrically-conductive state and a cutoff state. The positive line 44 of the lithium-ion battery 41 may be provided with a switch SW2 that is switchable between the electrically conductive state and the cutoff state. The switch SW1 and the switch SW2 each may be configured by a semiconductor element such as, but not limited to, a metal-oxide-semiconductor field-effect transistor (MOSFET). In an alternative implementation, the switch SW1 and the switch SW2 each may be a mechanical switch that opens and closes a contact by means of electromagnetic force, for example. Note that the switch SW1 and the switch SW2 each may include a component such as a relay and a contactor.

Referring to FIG. 1, the power supply circuit 40 may include a battery module 51. The lithium-ion battery 41 and the switches SW1 and SW2 may be incorporated into the battery module 51. The battery module 51 may further include a batter controller 52. The battery controller 52 may include a microcomputer, for example. The battery controller 52 may have a monitoring function and a control function. Non-limiting examples of the monitoring function may include monitoring of a state of charge SOC, charge and discharge currents, the terminal voltage, a cell temperature, and the internal resistance of the lithium-ion battery 41. Non-limiting examples of the control function may include controlling each of the switches SW1 and SW2. Note that the state of charge SOC may be a ratio of an electricity storage amount of a battery to a designed capacity of the battery.

Referring to FIG. 1 again, the positive line 45 of the lead-acid battery 42 may be coupled to an electrical device group 55 including electrical devices 54 such as headlights. The positive line 45 of the lead-acid battery 42 may be provided with a fuse 56 that protects the electrical device group 55 and other devices. The negative line 49 of the lead-acid battery 42 may be provided with a battery sensor 57 that detects the charge and discharge currents, the terminal voltage, the state of charge SOC, and/or other factors.

[Control System of Vehicle Control Apparatus]

Figure 3:
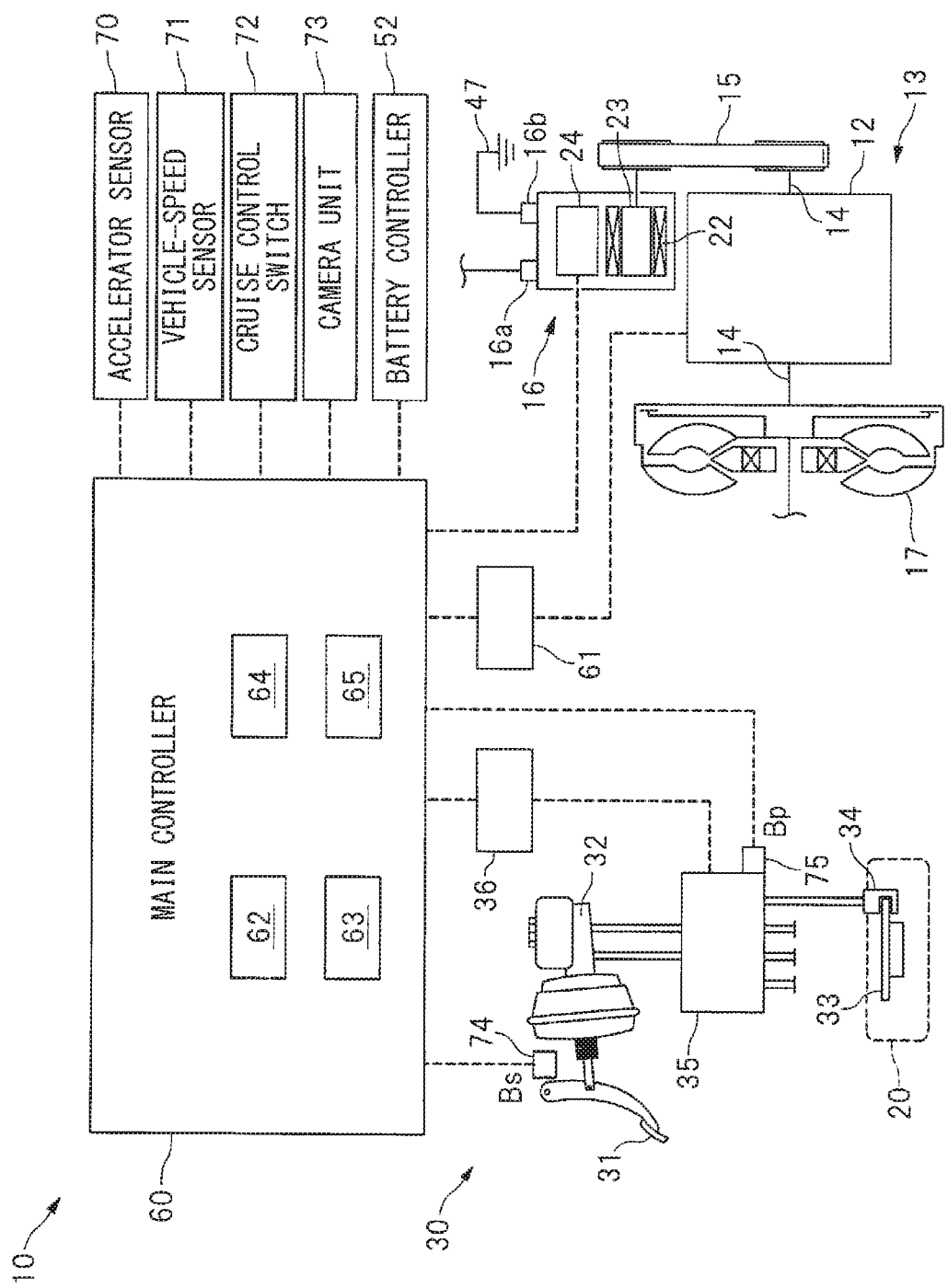
FIG. 3 is a diagram illustrating an example of a control system included in the vehicle control apparatus.

FIG. 3 is a diagram illustrating an example of a control system included in the vehicle control apparatus 10. As illustrated in FIGS. 1 and 3, the vehicle control apparatus 10 may be provided with a main controller 60. The main controller 60 may include a microcomputer, for example. The main controller 60 may be provided with controllers including an engine controller 62, an electric power-generation controller 63, a brake controller 64, and a cruise control controller 65. The engine controller 62 may output a control signal to the engine controller 61 to thereby control the engine 12. The electric power-generation controller 63 may output a control signal to the ISG controller 24 to thereby control the starter generator 16. The brake controller 64 may output a control signal to the brake controller 36 to thereby control the brake 30. The cruise control controller 65 may output a control signal to the engine controller 61 and the brake controller 36 to thereby execute the follow-up cruise control. The main controller 60 and the above-described controllers including the ISG controller 24, the brake controller 36, the battery controller 52, and the engine controller 61 may be so coupled to one another as to perform communication mutually and freely via an in-vehicle network 66. Non-limiting examples of the in-vehicle network 66 may include a controller area network (CAN) and a local interconnect network (LIN).

The main controller 60 may be coupled to devices including an accelerator sensor 70, a vehicle-speed sensor 71, a cruise control switch 72, a camera unit 73, a brake sensor 74, and a pressure sensor 75, for example. The accelerator sensor 70 may detect an amount of operation of an accelerator pedal performed by the occupant. The vehicle-speed sensor 71 may detect a vehicle speed V. The vehicle speed V may be a traveling speed of the vehicle 11. The cruise control switch 72 may be operated by the occupant when the follow-up cruise control is to be executed. The camera unit 73 may detect image information relating to a situation ahead of the vehicle. The brake sensor 74 may detect a brake stroke Bs. The brake stroke Bs may be an amount of operation of the brake pedal 31 performed by the occupant. The pressure sensor 75 may detect a brake fluid pressure Bp that is supplied to the caliper 34. The main controller 60 may receive information such as a revolution speed Ne of the engine 12 from the engine controller 61. The main controller 60 may receive information such as a revolution speed Nisg of the starter generator 16 from the ISG controller 24. The main controller 60 may receive information such as the state of charge SOC of the lithium-ion battery 41 from the battery controller 52. The main controller 60 may control the engine 12, the starter generator 16, and the brake 30 on the basis of information supplied from each controller and each sensor. In one implementation, the brake sensor may serve as a "first sensor". In one implementation, the pressure sensor may serve as a "second sensor". In one implementation, the brake stroke Bs may serve as a "brake operation amount".

[Follow-Up Cruise Control]

As described above, the vehicle 11 may have the follow-up cruise control function, which is one of the driver-assist functions and the automatic driving functions that automatically control the vehicle speed. The follow-up cruise control function may keep a constant distance between the own vehicle 11 and the preceding vehicle.

When the follow-up cruise control starts on the basis of the operation of the cruise control switch 72 performed by the occupant, the cruise control controller 65 of the main controller 60 may determine information relating to the preceding vehicle ahead of the own vehicle 11 on the basis of the image information obtained from the camera unit 73. Non-limiting examples of the information relating to the preceding vehicle may include presence or absence of the preceding vehicle, a distance between the own vehicle 11 and the preceding vehicle, and a difference in speed between the own vehicle 11 and the preceding vehicle. When the cruise control controller 65 determines that no preceding vehicle runs within a predetermined distance ahead of the own vehicle 11, the engine 12 and the transmission mechanism 18 may be so controlled as to keep a preset vehicle speed. The preset vehicle speed may be a predetermined vehicle speed that is set in advance. In contract, when the cruise control controller 65 determines that the preceding vehicle runs within the predetermined distance ahead of the own vehicle 11, the engine 12, the transmission mechanism 18, and the brake 30 may be so controlled as to keep a preset distance between the own vehicle 11 and the preceding vehicle within a range not exceeding the preset vehicle speed.

For example, when the own vehicle 11 moves away from the preceding vehicle, the cruise control controller 65 may increase an engine output and thereby automatically accelerate the vehicle 11. In contrast, when the own vehicle 11 moves close to the preceding vehicle, the cruise control controller 65 may increase the brake fluid pressure supplied to the caliper 34 and thereby automatically decelerate the vehicle 11. Accordingly, in a case where the follow-up cruise control is executed, the vehicle 11 may be automatically accelerated and decelerated on the basis of the situation ahead of the vehicle 11, even when the operation of the accelerator pedal or the brake pedal performed by the occupant has not been made. Note that the information relating to the preceding vehicle is collected by the camera unit 73 in an example implementation described above. However, this is not limitative. In an alternative implementation, the information relating to the preceding vehicle may be collected with use of a device such as a millimeter wave radar.

[Electric Power-Generation Control of Starter Generator]

The power-generation controller 63 of the main controller 60 may set a target power-generation voltage of the starter generator 16 on the basis of the state of charge SOC of the lithium-ion battery 41. The power-generation controller 63 may output information relating to the target power-generation voltage to the ISG controller 24. Thereafter, the ISG controller 24 may control the voltage generated by the starter generator 16 in accordance with the information relating to the target power-generation to thereby control the starter generator 16 into a combustion power generation state or a power generation suspended state, as described later. Accordingly, the power-generation controller 63 of the main controller 60 may control the starter generator 16 into the combustion power generation state or the power generation suspended state on the basis of the state of charge SOC of the lithium-ion battery 41.

Figure 4:
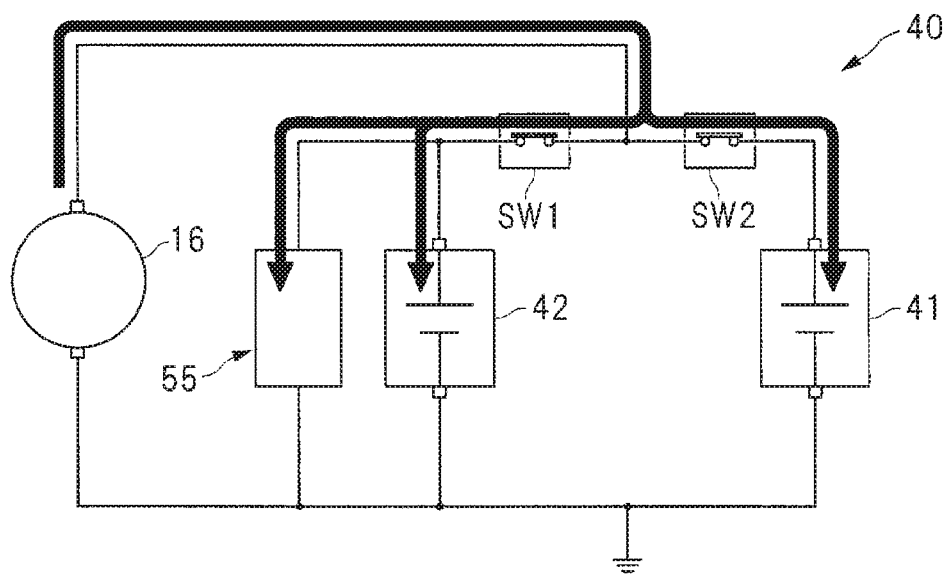
FIG. 4 is a diagram illustrating an example of an electric current supply situation when a starter generator is controlled into a combustion power generation state.

FIG. 4 is a diagram illustrating an example of an electric current supply situation when the starter generator 16 is controlled into the combustion power generation state. For example, in a case where the state of charge SOC, i.e. a charged level, of the lithium-ion battery 41 falls below a predetermined lower limit, the starter generator 16 may be so driven as to generate electricity by engine power in order to charge the lithium-ion battery 41 for enhancement of the state of charge SOC. When the starter generator 16 is to be controlled into the combustion power generation state, the voltage generated by the starter generator 16 may be raised, and the generated voltage applied to the lithium-ion battery 41 may be adjusted higher than the terminal voltage. This causes the starter generator 16 to supply currents to components including the lithium-ion battery 41, the electrical device group 55, the lead-acid battery 42, as indicated by black arrows in FIG. 4. Consequently, the lithium-ion battery 41 and the lead-acid battery 42 are gently charged.

Figure 5:
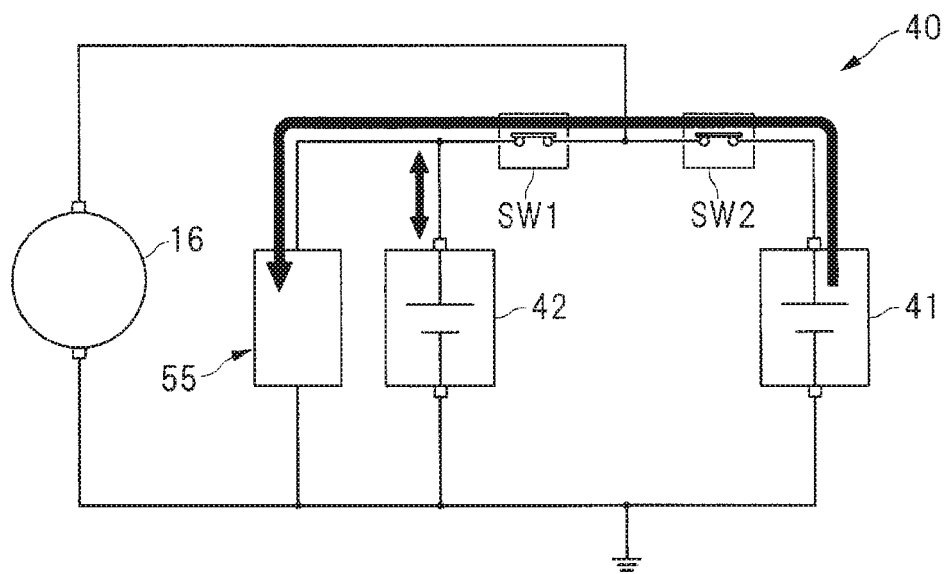
FIG. 5 is a diagram illustrating an example of an electric current supply situation when the starter generator is controlled into a power generation suspended state.

FIG. 5 is a diagram illustrating an example of an electric current supply situation when the starter generator 16 is controlled into the power generation suspended state. For example, in a case where the state of charge SOC, i.e. a charged level, of the lithium-ion battery 41 exceeds a predetermined upper limit, the driving of the starter generator 16 to generate electricity by the engine power may be suspended in order to actively discharge the lithium-ion battery 41. Accordingly, when the starter generator 16 is to be controlled into the power-generation suspended state, the voltage generated by the starter generator 16 may be lowered, and the generated voltage applied to the lithium-ion battery 41 may be adjusted lower than the terminal voltage. This causes the lithium-ion battery 41 to supply currents to the electrical device group 55, as indicated by the black arrow in FIG. 5. This makes it possible to suppress or suspend the driving of the starter generator 16 to generate electricity, leading to the reduction in engine load.

As described previously, the power-generation controller 63 of the main controller 63 may control the starter generator 16 into the state such as the combustion power generation state or the power generation suspended state on the basis of the state of charge SOC. Upon the vehicle deceleration, it is advantageous to collect large kinetic energy for enhancement of a fuel consumption performance. For this reason, upon the vehicle deceleration, the voltage generated by the starter generator 16 may be raised greatly, and the starter generator 16 may be controlled into the regenerative power generation state. This makes it possible to increase the electric power generated by the starter generator 16, i.e. the regenerative electric power. Accordingly, it is possible to actively convert the kinetic energy into the electric energy and collect the converted electric energy. Hence, it becomes possible to enhance an energy efficiency of the vehicle 11 and to thereby improve the fuel consumption performance of the vehicle 11.

Whether or not to control the starter generator 16 into the regenerative power generation state may be determined on the basis of a factor such as a situation relating to the operation of the accelerator pedal or the brake pedal 31. Upon the vehicle deceleration, fuel supply to the engine 12 may be restricted. Therefore, the starter generator 16 may be controlled into the regenerative power-generation state. In an example implementation, the vehicle deceleration may occur when the accelerator pedal is released from being pressed down or when the brake pedal 31 is pressed down. Upon an acceleration traveling or a steady traveling during which the accelerator pedal is pressed down, a fuel may be injected in the engine 12. Therefore, the starter generator 16 may be controlled into the combustion power generation state or the power generation suspended state.

Figure 6:
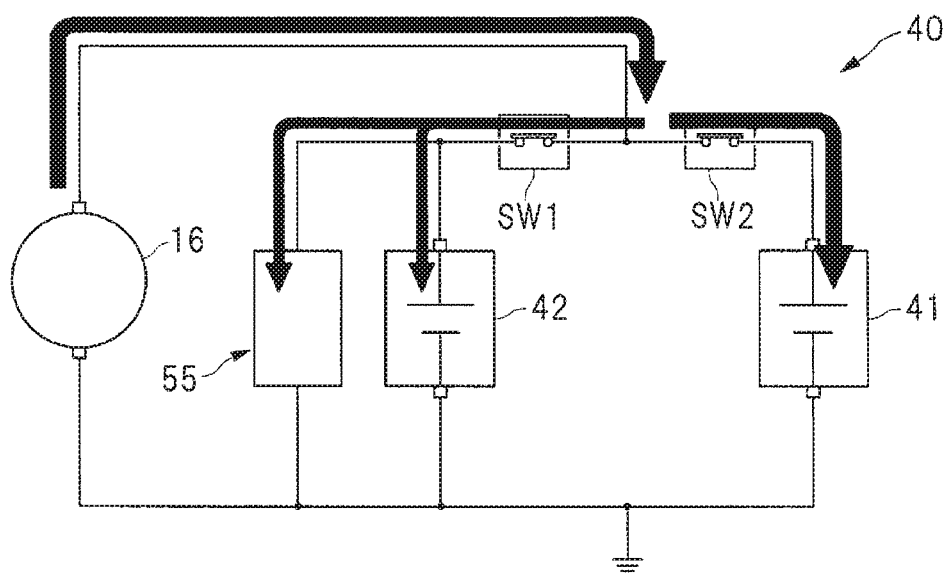
FIG. 6 is a diagram illustrating an example of an electric current supply situation when the starter generator is controlled into a regenerative power generation state.

FIG. 6 is a diagram illustrating an example of an electric current supply situation when the starter generator 16 is controlled into the regenerative power generation state. When the starter generator 16 is to be controlled into the regenerative power generation state, the voltage generated by the starter generator 16 may be raised more than that in the above-described combustion power generation state, and the generated voltage applied to the lithium-ion battery 41 may be raised significantly more than the terminal voltage. This causes the starter generator 16 to supply a large electric current to components including the lithium-ion battery 41 and the lead-acid battery 42, as indicated by the black arrows in FIG. 6. Therefore, the lithium-ion battery 41 and the lead-acid battery 42 may be quickly charged. In addition, the lithium-ion battery 41 may have the internal resistance that is designed smaller than the internal resistance of the lead-acid battery 42. Therefore, most of the generated electric currents may be supplied to the lithium-ion battery 41.

Referring to FIGS. 4 to 6, when the starter generator 16 is to be controlled into the combustion power generation state, the regenerative power generation state, or the power generation suspended state, the switch SW1 and the switch SW2 may be held in the electrically-conductive state. In other words, the vehicle control apparatus 10 makes it possible to control the charge and the discharge of the lithium-ion battery 41 by simply controlling the voltage generated by the starter generator 16, without switching between the switch SW1 and the switch SW2. This makes it possible to easily control the charge and the discharge of the lithium-ion battery 41, and to improve durability of the switch SW1 and the switch SW2.

[Regenerative Torque of Starter Generator]

As described previously, upon the vehicle deceleration during which the accelerator pedal is released from being pressed down or the brake pedal 31 is pressed down, the starter generator 16 may be controlled into the regenerative power generation state. When the starter generator 16 is to be controlled into the regenerative power generation state, it may be demanded to limit the electric power generation torque (i.e. the regenerative torque) of the electric power generator 16 to thereby prevent the occupant from experiencing the feeling of strangeness, caused due to excessive deceleration. For example, in a situation where the vehicle 11 gently decelerates, the increase of the regenerative torque may remarkably reflect the increase of vehicle deceleration rate. Therefore, it may be demanded to limit the regenerative torque to thereby prevent the occupant from experiencing the feeling of strangeness.

Figure 7:
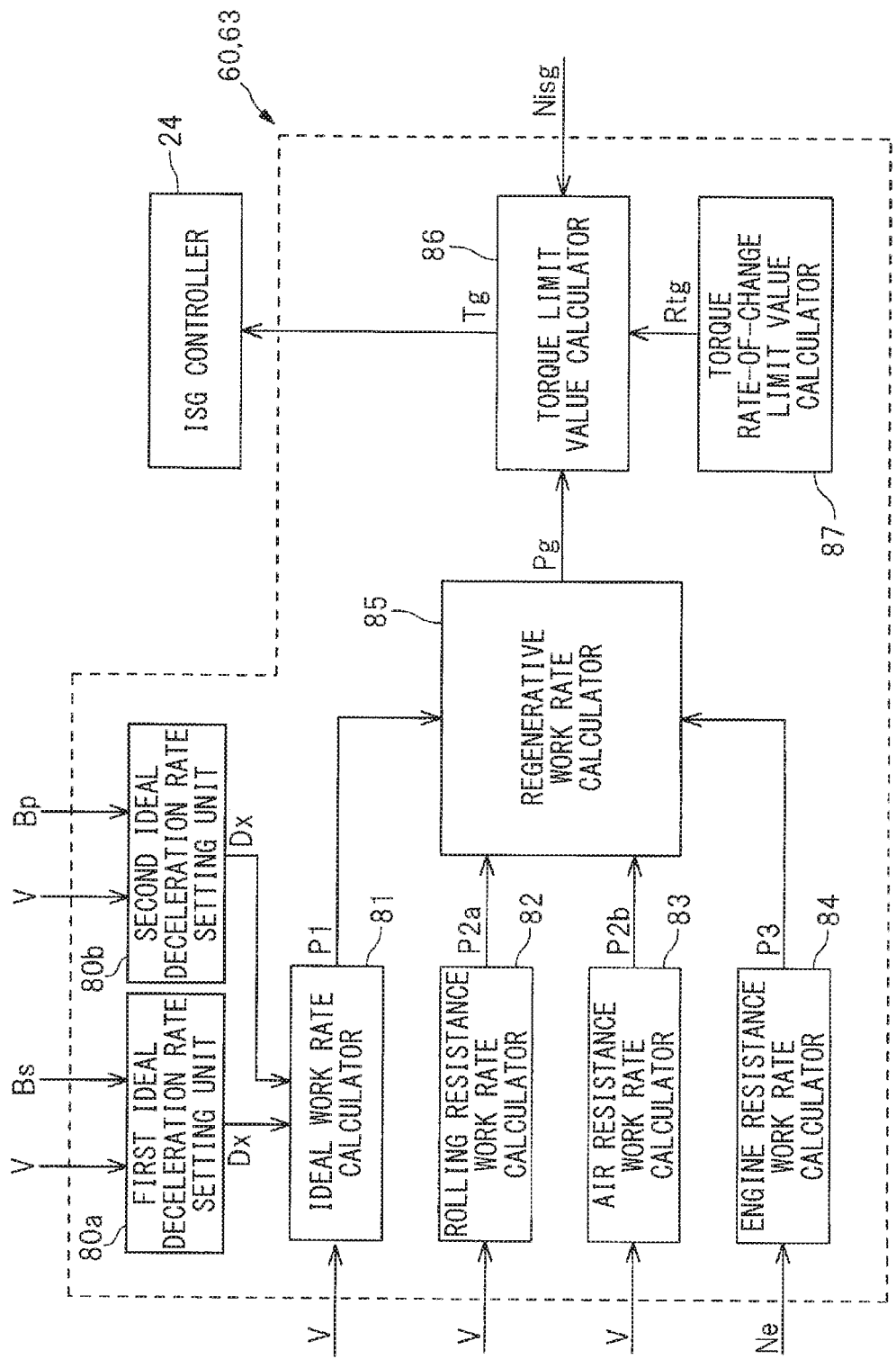
FIG. 7 is a block diagram illustrating a part of a power generation controller included in a main controller illustrated in FIG. 1.

A description is given below of a limit control of the regenerative torque in the starter generator 16. FIG. 7 is a block diagram illustrating a part of the power generation controller 63 included in the main controller 60. As illustrated in FIG. 7, the power generation controller 63 of the main controller 60 may include a first ideal deceleration rate setting unit 80a, a second ideal deceleration rate setting unit 80b, an ideal work rate calculator 81, a rolling resistance work rate calculator 82, an air resistance work rate calculator 83, an engine resistance work rate calculator 84, a regenerative work rate calculator 85, and a torque limit value calculator 86.

The first ideal deceleration rate setting unit 80a and the second ideal deceleration rate setting unit 80b may refer to a predetermined deceleration rate table, and thereby set an ideal deceleration rate Dx, i.e. an allowable deceleration rate of the vehicle 11. In an example implementation, the ideal deceleration rate Dx may be an allowable deceleration rate that is allowable upon the vehicle deceleration in terms of drivability. In an example implementation, the ideal deceleration rate Dx may be an upper limit of the vehicle deceleration rate which prevents the occupant from experiencing the strong feeling of strangeness. In other words, upon the vehicle deceleration, suppressing the vehicle deceleration rate to no greater than the ideal deceleration rate Dx makes it possible to cause the vehicle 11 to be decelerated without the strong feeling of strangeness experienced by the occupant. In one implementation, the first ideal deceleration rate setting unit 80a may serve as a "first deceleration rate setting unit". In one implementation, the second ideal deceleration rate setting unit 80b may serve as a "second deceleration rate setting unit".

Figure 8A:
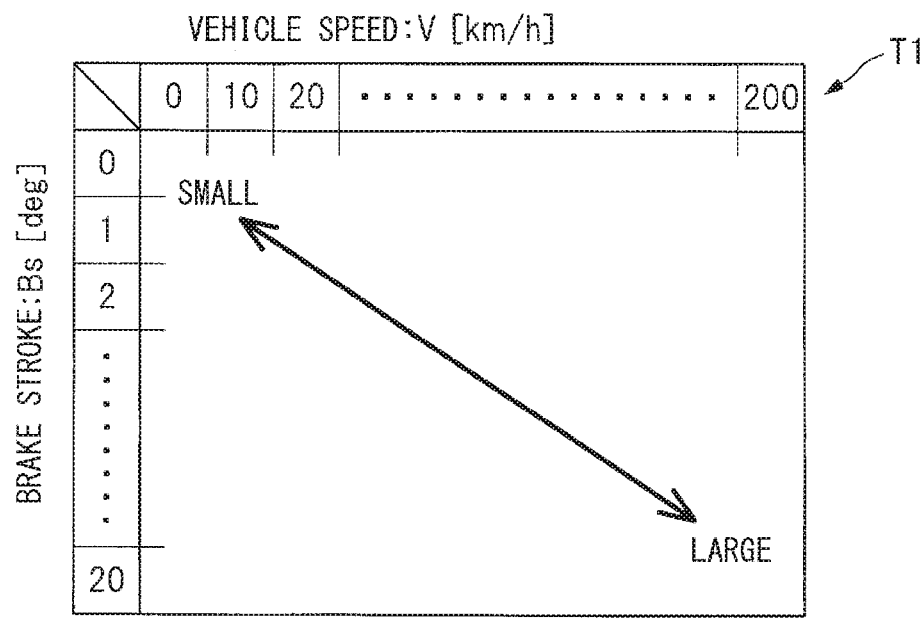
FIG. 8A is a diagram schematically illustrating a deceleration rate table to which a reference is made when an ideal deceleration rate is to be set.
Figure 8B:
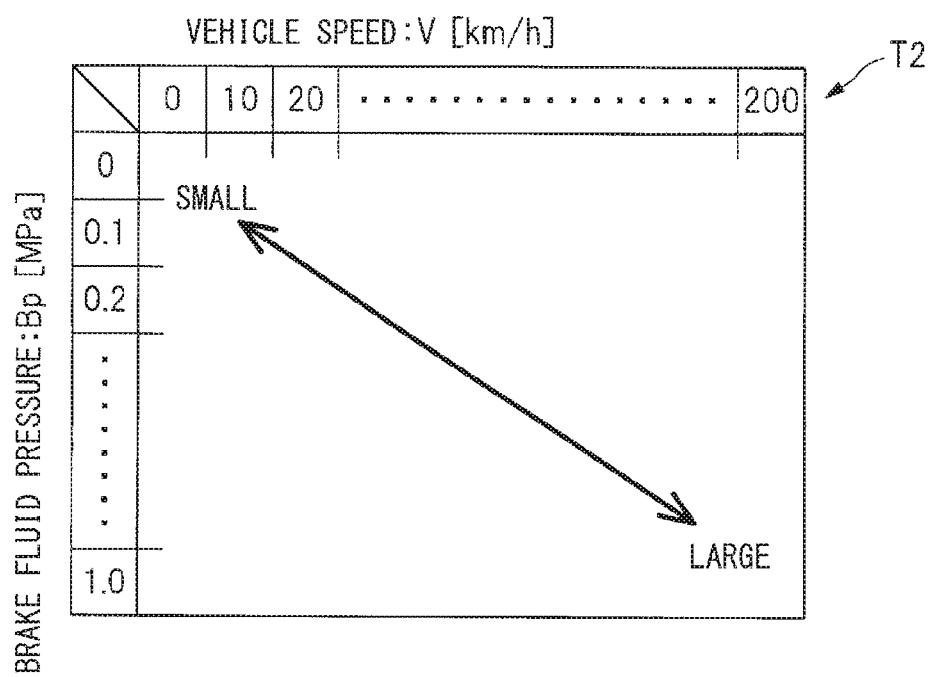
FIG. 8B is another diagram schematically illustrating the deceleration rate table to which a reference is made when the ideal deceleration rate is to be set.

FIGS. 8A and 8B are diagrams schematically illustrating deceleration rate tables T1 and T2 to which a reference is made when the ideal deceleration rates Dx are set. During the follow-up cruise control being stopped, i.e. when the manual mode is executed, the first ideal deceleration rate setting unit 80a may set the ideal deceleration rate Dx on the basis of the deceleration rate table T1 illustrated in FIG. 8A. The manual mode may be a control mode that decelerates the vehicle 11 on the basis of the brake operation performed by the occupant. In an example implementation, in the manual mode, the first ideal deceleration rate setting unit 80a may refer to the deceleration rate table T1 on the basis of the vehicle speed V and the brake stroke Bs, and set the ideal deceleration rate Dx that is upon the vehicle deceleration, on the basis of the deceleration rate table T1. As illustrated in FIG. 8A, the ideal deceleration rate Dx upon the manual mode may be set smaller as the vehicle speed decreases and may be set larger as the vehicle speed increases. Further, the ideal deceleration rate Dx upon the manual mode may be set smaller as the brake stroke Bs decreases and may be set larger as the brake stroke Bs increases. In one implementation, the deceleration rate table T1 may serve as a "first data group".

During the follow-up cruise control being executed, i.e. when the automatic mode is executed, the second ideal deceleration rate setting unit 80b may set the ideal deceleration rate Dx on the basis of the deceleration rate table T2 illustrated in FIG. 8B. The automatic mode may be a control mode that decelerates the vehicle 11 on the basis of situation ahead of the vehicle 11. In an example implementation, in the automatic mode, the second ideal deceleration rate setting unit 80b may refer to the deceleration rate table T2 on the basis of the vehicle speed V and the brake fluid pressure Bp, and set the ideal deceleration rate Dx that is upon the vehicle deceleration, on the basis of the deceleration rate table T2 that is different from the deceleration rate table T1. As illustrated in FIG. 8B, the ideal deceleration rate Dx upon the automatic mode may be set smaller as the vehicle speed decreases and may be set larger as the vehicle speed increases. Further, the ideal deceleration rate Dx upon the automatic mode may be set smaller as the brake fluid pressure Bp decreases and may be set larger as the brake fluid pressure Bp increases. In one implementation, the deceleration rate table T2 may serve as a "second data group".

In the manual mode in which the vehicle 11 may be decelerated on the basis of the brake operation, the brake pedal 31 may be operated by the occupant. Therefore, the first ideal deceleration rate setting unit 80a may set the ideal deceleration rate Dx on the basis of the brake stroke Bs. In contrast, in the automatic mode in which the vehicle 11 is decelerated on the basis of the situation ahead of the vehicle 11, the brake pedal 31 may not be operated by the occupant. Therefore, the second ideal deceleration rate setting unit 80b may set the ideal deceleration rate Dx on the basis of the brake fluid pressure Bp.

The ideal work rate calculator 81 thereafter may calculate a vehicle ideal deceleration work rate P1 with use of the ideal deceleration rate Dx on the basis of the following expression (1):

$$P1 \text{ [W]} = Wv \text{ [kg]} \times Dx \text{ [m/s}^2\text{]} \times V \text{ [m/s]} \quad (1)$$

where "Wv" denotes vehicle mass. In an example implementation, the vehicle ideal deceleration work rate P1 may be a work rate that causes the vehicle deceleration rate to reach the ideal deceleration rate Dx. In other words, decelerating the vehicle 11 with use of energy equivalent to the vehicle ideal deceleration work rate P1 makes it possible to increase the vehicle deceleration rate to the ideal deceleration rate Dx. In one implementation, the ideal work rate calculator 81 may serve as a "first work rate calculator". In one implementation, the vehicle ideal deceleration work rate P1 may serve as a "first deceleration work rate".

The rolling resistance work rate calculator 82 may calculate a rolling resistance work rate P2a with use of the vehicle speed V on the basis of the following expression (2):

$$P2a \text{ [W]} = \mu r \times Wv \text{ [kg]} \times g \text{ [m/s}^2\text{]} \times V \text{ [m/s]} \quad (2)$$

where "μr" denotes a rolling resistance coefficient and "g" denotes gravitational acceleration. In an example implementation, the rolling resistance work rate P2a may be a work rate corresponding to traveling resistance that decelerates the vehicle 11 upon the vehicle deceleration. In one implementation, the rolling resistance work rate calculator 82 may serve as a "second work rate calculator". In one implementation, the rolling resistance work rate P2a may serve as a "second deceleration work rate".

The air resistance work rate calculator 83 may calculate an air resistance work rate P2b with use of the vehicle speed V on the basis of the following expression (3):

$$P2b \text{ [W]} = \mu l \times \rho \text{ [kg/m}^3\text{]} \times S \text{ [m}^2\text{]} \times \{V \text{ [m/s]}\}^3 \quad (3)$$

where "μl" denotes an air resistance coefficient, "ρ" denotes an air density, and "S" denotes frontal projected area. The air resistance work rate P2b may be a work rate corresponding to the traveling resistance that decelerates the vehicle 11 upon the vehicle deceleration. In one implementation, the air resistance work rate calculator 83 may serve as the "second work rate calculator". In one implementation, the air resistance work rate P2b may serve as the "second deceleration work rate".

The engine resistance work rate calculator 84 may calculate an engine friction work rate P3 with use of the number of revolutions Ne of the engine 12, i.e. revolution speed of the engine 12, on the basis of the following expression (4):

$$P3 \text{ [W]} = Tef \text{ [Nm]} \times Ne \text{ [rad/s]} \quad (4)$$

where "Tef" denotes engine friction torque equivalent to brake torque of engine brake. In an example implementation, the engine friction work rate P3 may be a work rate corresponding to engine revolution resistance that decelerates the vehicle 11 upon the vehicle deceleration. The engine friction torque Tef may be total torque of pumping loss torque of the engine 12, mechanical loss torque of the engine 12, and ISG belt friction torque. The pumping loss torque of the engine may be revolution resistance torque that is generated during an intake stroke and an exhaust stroke of the engine 12.

The mechanical loss torque of the engine 12 may be calculated by subtracting net torque of the engine from indicated torque of the engine, i.e. revolution resistance torque derived from friction resistance inside the engine 12. The ISG belt friction torque may be revolution resistance torque derived from revolution resistance of the belt mechanism 15. In one implementation, the engine resistance work rate calculator 84 may serve as a "third work rate calculator". In one implementation, the engine friction work rate P3 may serve as a "third deceleration work rate".

The regenerative work rate calculator 85 may calculate a regenerative work rate Pg by subtracting the rolling resistance work rate P2a, the air resistance work rate P2b, and the engine friction work rate P3 from the vehicle ideal deceleration work rate P1 on the basis of the following expression (5):

$$Pg \text{ [W]} = \{P1 \text{ [W]} - P2a \text{ [W]} - P2b \text{ [W]} - P3 \text{ [W]}\} \quad (5)$$

In the expression (5), the regenerative work rate Pg may be a work rate that is allowable for regenerative power generation that is upon the vehicle deceleration, i.e. an upper limit of a work rate that is allowable for the starter generator 16 that is upon the vehicle deceleration. In one implementation, the regenerative work rate calculator 85 may serve as an "upper limit work rate calculator". In one implementation, the regenerative work rate Pg may serve as an "upper limit work rate".

The torque limit value calculator 86 may calculate a regenerative torque limit value Tg by dividing the regenerative work rate Pg by the revolution speed Nisg of the starter generator 16 on the basis of the following expression (6):

$$Tg \text{ [Nm]} = Pg \text{ [W]}/Nisg \text{ [rad/s]} \quad (6)$$

In the expression (6), the regenerative torque limit value Tg may be an upper limit of the regenerative torque that is allowable for the starter generator 16 that is upon the vehicle deceleration. In one implementation, the torque limit value calculator 86 may serve as an "upper limit torque calculator". In one implementation, the regenerative torque limit value may serve as an "upper limit torque".

The regenerative torque limit value Tg thus-calculated by the torque limit value calculator 86 may be outputted, as a command value, from the torque limit value calculator 86 to the ISG controller 24. The ISG controller 24 as the electric power generation torque controller in one implementation may limit the regenerative torque of the starter generator 16 on the basis of the regenerative torque limit value Tg. Limiting the regenerative torque of the starter generator 16 to no greater than the regenerative torque limit value Tg makes it possible to suppress the vehicle deceleration rate upon the vehicle deceleration to the ideal deceleration rate Dx or less. Therefore, it is possible to decelerate the vehicle 11 without the feeling of strangeness experienced by the occupant.

In addition, the ideal deceleration rate Dx may be set on the basis of the brake stroke Bs when the manual mode is executed, in consideration of a situation where the vehicle 11 is decelerated by the brake operation performed by the occupant. In contrast, the ideal deceleration rate Dx may be set on the basis of the brake fluid pressure Bp supplied from the actuator 35 to the caliper 34 when the automatic mode is executed, in consideration of a situation where the vehicle 11 is decelerated without the brake pedal being operated. This makes it possible to appropriately set the ideal deceleration rate Dx even in a situation where the automatic mode is executed, i.e. a situation where the vehicle 11 is automatically decelerated in accordance with a situation ahead of the vehicle 11. Accordingly, it is possible to appropriately control or limit the regenerative torque of the starter generator 16.

Further, similarly to the vehicle ideal deceleration work rate P1, the rolling resistance work rate P2a, the air resistance work rate P2b, the engine friction work rate P3, and the regenerative work rate Pg, the regenerative torque limit value Tg may be calculated by the conversion of the vehicle deceleration rate into the work rate, i.e. energy per unit time. In an example implementation, the regenerative torque limit value Tg may limit the vehicle deceleration rate to no greater than the ideal deceleration rate Dx. Calculating the regenerative torque limit value Tg with use of the work rate makes it possible to calculate the regenerative torque limit value Tg without constructing map data for every traveling situation. This makes it possible to reduce a workload for constructing complicated map data, and reduce the cost of the vehicle control apparatus 10. Moreover, this procedure involves calculating the regenerative limit value Tg from the ideal deceleration rate Dx without using such complicated map data. Therefore, it is possible to enhance control stability even when disturbance occurs.

Note that the feeling of strangeness may be experienced by the occupant even when limiting the regenerative torque to no greater than the regenerative torque limit value Tg, if the regenerative torque limit value Tg fluctuates greatly. To deal with such a situation, the main controller 60 may be provided with a torque rate-of-change limit value calculator 87 that sets a regenerative torque rate-of-change limit value Rtg. The torque limit value calculator 86 may limit an update amount of the regenerative torque limit value Tg with use of the regenerative torque rate-of-change limit value Rtg, and thereby suppress an excessive variation in the regenerative torque limit value Tg. In an example implementation, the regenerative torque rate-of-change limit value Rtg may be a value that is set in advance. In an alternative implementation, the regenerative torque rate-of-change limit value Rtg may be a value that is calculated on the basis of a factor such as the vehicle speed V or the regenerative torque limit value Tg.

[Regenerative Torque Limit Control]

Figure 9:
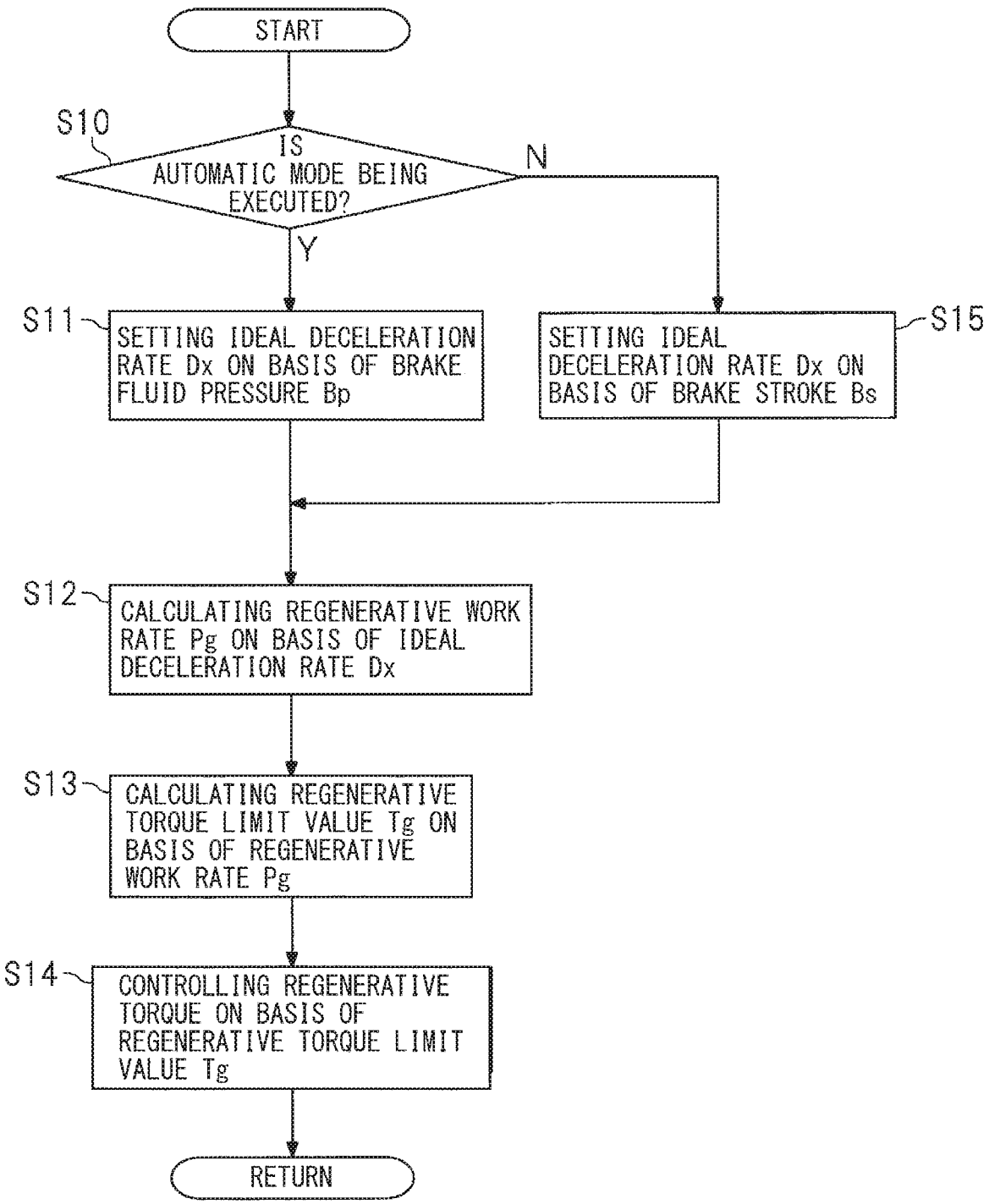
FIG. 9 is a flowchart illustrating an example of a procedure for executing regenerative torque limit control.

A description is given next of a regenerative torque limit control of the above-described starter generator 16 with reference to a flowchart. FIG. 9 is a flowchart illustrating an example of a procedure for executing the regenerative torque limit control.

As illustrated in FIG. 9, in step S10, a determination may be made as to whether the automatic mode is being executed. When it is determined in step S10 that the automatic mode is being executed, i.e. the follow-up cruise control is being executed ("Y" in step S10), the flow may proceed to step S11. In step S11, the ideal deceleration rate Dx may be set on the basis of the brake fluid pressure Bp. Thereafter, in step S12, the regenerative work rate Pg that is allowable for the regenerative power generation upon the vehicle deceleration may be calculated on the basis of the ideal deceleration rate Dx. Thereafter, in step S13, the regenerative torque limit value Tg that is allowable for the starter generator 16 may be calculated on the basis of the regenerative work rate Pg. Thereafter, the flow may proceed to step S14. In step S14, the regenerative torque of the starter generator 16 may be limited to no greater than the regenerative torque limit value Tg on the basis of the regenerative torque limit value Tg.

When it is determined in step S10 that the manual mode is being executed, i.e. the follow-up cruise control is being stopped ("N" in step S10), the flow may proceed to step S15. In step S15, the ideal deceleration rate Dx may be set on the basis of the brake stroke Bs. Thereafter, in step S12, the regenerative work rate Pg that is allowable for the regenerative power generation upon the vehicle deceleration may be calculated on the basis of the ideal deceleration rate Dx. Thereafter, in step S13, the regenerative torque limit value Tg that is allowable for the starter generator 16 may be calculated on the basis of the regenerative work rate Pg. Thereafter, the flow may proceed to step S14. In step S14, the regenerative torque of the starter generator 16 may be limited to no greater than the regenerative torque limit value Tg on the basis of the regenerative torque limit value Tg.

The ideal deceleration rate Dx may be set on the basis of the brake stroke Bs when the manual mode is executed, in consideration of a situation where the vehicle 11 is decelerated by the brake operation performed by the occupant. In contrast, the ideal deceleration rate Dx may be set on the basis of the brake fluid pressure Bp supplied from the actuator 35 to the caliper 34 when the automatic mode is executed, in consideration of a situation where the vehicle 11 is decelerated without the brake pedal 31 being operated. This makes it possible to appropriately set the ideal deceleration rate Dx even in a situation where the automatic mode is executed, i.e. a situation where the vehicle 11 is automatically decelerated in accordance with a situation ahead of the vehicle 11. Accordingly, it is possible to appropriately control or limit the regenerative torque of the starter generator 16. Hence, it is possible to ensure the regenerative power generation upon the vehicle deceleration and to decelerate the vehicle 11 without the feeling of strangeness experienced by the occupant.

[Other Implementations]

Figure 10:
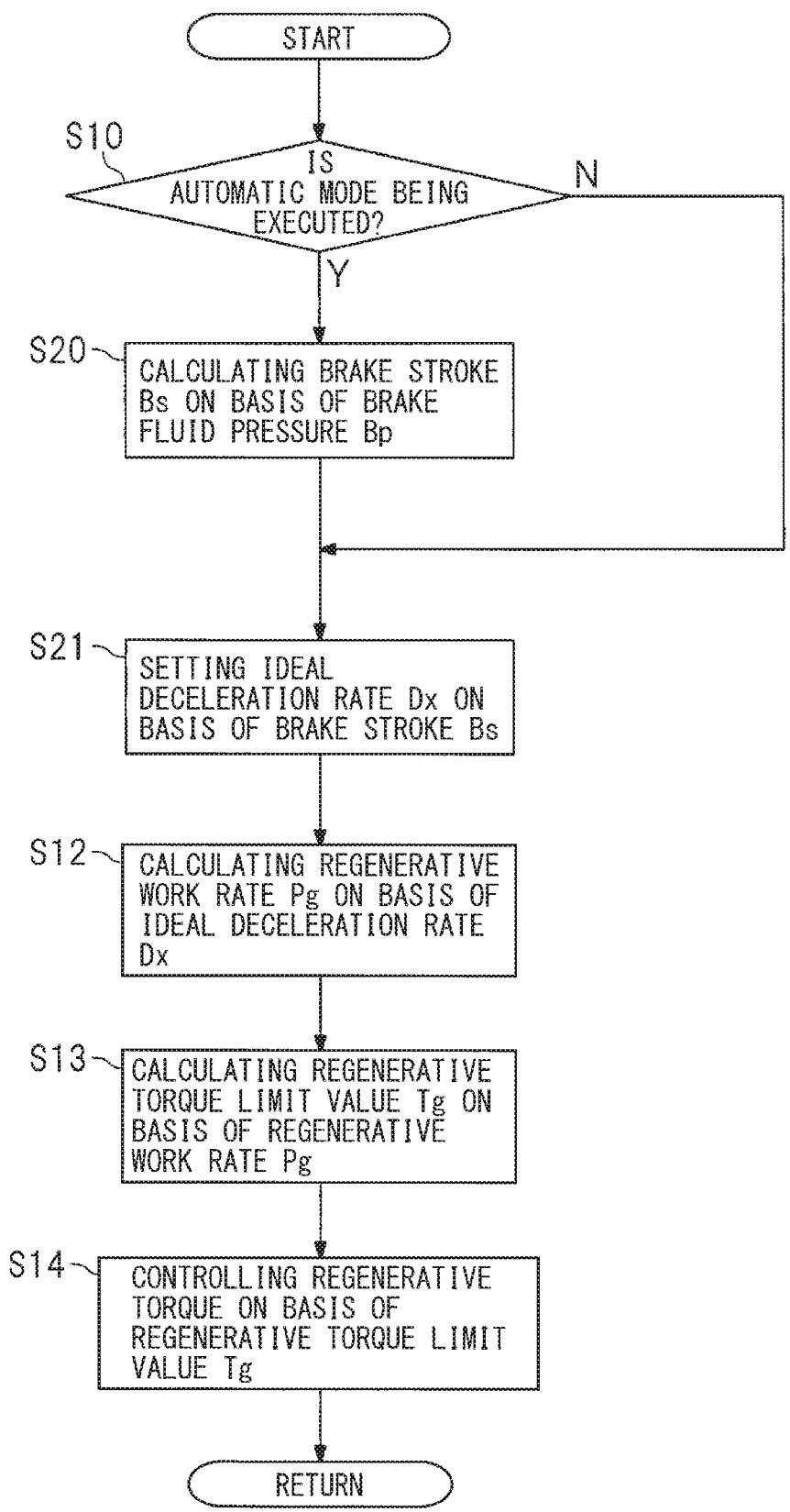
FIG. 10 is a flowchart illustrating another example of a procedure for executing the regenerative torque limit control.

A description is given next of another example of the regenerative torque limit control of the starter generator 16 with reference to another flowchart. FIG. 10 is a flowchart illustrating another example of a procedure for executing the regenerative torque limit control. Note that, in FIG. 10, steps similar to those in FIG. 9 are denoted with the same reference numerals and the descriptions thereof will not be provided in detail.

As illustrated in FIG. 10, in step S10, a determination may be made as to whether the automatic mode is being executed. When it is determined in step S10 that the automatic mode is being executed, i.e. the follow-up cruise control is being executed ("Y" in step S10), the flow may proceed to step S20. In step S20, the brake fluid pressure Bp may be converted into the brake stroke Bs. In an example implementation, in step S20, the brake stroke Bs having a larger value may be set as the brake fluid pressure Bp is higher, and the brake stroke Bs having a smaller value may be set as the brake fluid pressure Bp is lower.

In step S20, when the brake stroke Bs is calculated from the brake fluid pressure Bp, the flow may proceed to step S21. In step S21, the ideal deceleration rate Dx may be set on the basis of the brake stroke Bs. Further, when it is determined in step S10 that the manual mode is being executed, i.e. the follow-up cruise control is being stopped ("N" in step S10), the flow may proceed to step S21. In step S21, the ideal deceleration rate Dx may be set on the basis of the brake stroke Bs. In step S12, the regenerative work rate Pg that is allowable for the regenerative power generation upon the vehicle deceleration may be calculated on the basis of the ideal deceleration rate Dx. In step S13, the regenerative torque limit value Tg that is allowable for the starter generator 16 may be calculated on the basis of the regenerative work rate Pg. Thereafter, the flow may proceed to step S14. In step S14, the regenerative torque of the starter generator 16 may be limited to no greater than the regenerative torque limit value Tg on the basis of the regenerative torque limit value Tg.

The ideal deceleration rate Dx may be set on the basis of the brake stroke Bs when the manual mode is executed, in consideration of a situation where the vehicle 11 is decelerated by the brake operation performed by the occupant. In other words, the first ideal deceleration rate setting unit 80a may set the ideal deceleration rate Dx on the basis of the brake stroke Bs. In contrast, the brake fluid pressure Bp may be converted into the brake stroke Bs, and the ideal deceleration rate Dx may be set on the basis of the converted brake stroke Bs when the automatic mode is executed, in consideration of a situation where the vehicle 11 is decelerated without the brake pedal 31 being operated. In other words, the second ideal deceleration rate setting unit 80b may convert the brake fluid pressure Bp into the brake stroke Bs, and may set the ideal deceleration rate Dx on the basis of the converted brake stroke Bs.

This makes it possible to appropriately set the ideal deceleration rate Dx even in a situation where the automatic mode is executed, i.e. a situation where the vehicle 11 is automatically decelerated in accordance with a situation ahead of the vehicle 11. Accordingly, it is possible to appropriately control or limit the regenerative torque of the starter generator 16. Hence, it is possible to ensure the regenerative power generation upon the vehicle deceleration and to decelerate the vehicle 11 without the feeling of strangeness experienced by the occupant. Further, when the automatic mode is executed, the brake fluid pressure Bp may be converted into the brake stroke Bs. Therefore, it is possible to use a deceleration rate table common to the manual mode when setting the ideal deceleration rate Dx. Hence, it is possible to reduce the deceleration rate table, leading to the reduction in a workload for developing a system. Although some implementations of the technology have been described in the foregoing with reference to the accompanying drawings, the technology is by no means limited to the implementations described above. Various changes and modifications may be made to any implementation without departing from the scope of the technology. In an example implementation described above, the starter generator 16, i.e. the ISG controller, is used as an electric power generator; however, this is not limitative. In an alternative implementation, an alternator or a motor generator may be used as the electric power generator. Further, in an implementation described above, the ISG controller 24 serves as the power generation torque controller; however, this is not limitative. In an alternative implementation, the power generation torque controller may be provided to the main controller 60.

In an example implementation described above, the brake stroke Bs is detected by the brake sensor 74 that detects an angle of operation of the brake pedal 31 performed by the occupant; however, this is not limitative. For example, the brake fluid pressure outputted from the master cylinder 32 may be detected, and the brake stroke Bs may be estimated from the detected brake fluid pressure. In this case, the brake stroke Bs having a larger value may be estimated as the brake fluid pressure outputted from the master cylinder 32 becomes higher, and the brake stroke Bs having a smaller value may be estimated as the brake fluid pressure outputted from the master cylinder 32 becomes lower.

In an example implementation described above, the ideal deceleration rate Dx is set on the basis of the vehicle speed V and the brake stroke Bs during the follow-up cruise control being stopped, and the ideal deceleration rate Dx is set on the basis of the vehicle speed V and the brake fluid pressure Bp during the follow-up cruise control being executed; however, this is not limitative. For example, in the vehicle 11 having a control mode such as a manual mode that may set a transmission gear ratio by a manual operation performed by the occupant, or an engine brake mode that may so set the transmission gear ratio as to achieve the deceleration by the manual operation performed by the occupant, the ideal deceleration rate Dx may be increased when such a mode is executed. This makes it possible to actively increase the electric power generation torque of the starter generator 16 in a control mode such as the manual mode in which large deceleration rate is allowed, and to enhance energy efficiency of the vehicle 11.

In an implementation described above, both the rolling resistance work rate P2a and the air resistance work rate P2b are used in order to calculate the regenerative work rate Pg; however, this is not limitative. In an example implementation, the regenerative work rate Pg may be calculated without using the rolling resistance work rate P2a. In an alternative implementation, the regenerative work rate Pg may be calculated without using the air resistance work rate P2b. Further, in an implementation described above, the engine friction work rate P3 is used in order to calculate the regenerative torque limit value Tg; however, this is not limitative. In an example implementation, the regenerative torque limit value Tg may be calculated without using the engine friction work rate P3.

Further, the power supply circuit 40 included in the vehicle 11 is not limited to the illustrated power supply circuit 40. In an example implementation described above, the illustrated power supply circuit 40 includes the lithium-ion battery 41 and the lead-acid battery 42; however, this is not limitative. In an example implementation, the power supply circuit 40 may include a single electricity storage. Further, in an example implementation described above, the positive line 44 of the lithium-ion battery 41 is provided with the switch SW2, this is not limitative. In an example implementation, as indicated by an alternate long and short dashed line in FIG. 2, the switch SW2 may be provided on the negative line 48 of the lithium-ion battery 41.

The main controller 60 illustrated in FIGS. 1, 3, and 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 60 illustrated in FIGS. 1, 3, and 7.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus for a vehicle, the vehicle control apparatus comprising:
a brake system that includes:
a brake operation device configured to be operated by an occupant of the vehicle;
a wheel braking device configured to apply brake on a wheel of the vehicle using a brake fluid; and
a fluid pressure device configured to provide a brake fluid pressure of the brake fluid to be supplied to the wheel braking device, wherein the brake system includes:
a first control mode in which the vehicle decelerates based on the brake operation performed by the occupant of the vehicle such that i) a first brake fluid pressure of the brake fluid is determined according to an amount of the brake operation by the occupant and ii) the brake is applied on the wheel based on the determined first brake fluid pressure; and
a second control mode in which the vehicle automatically decelerates based on a distance between the vehicle and a preceding vehicle and without the brake operation of the occupant such that i) a second brake fluid pressure of the brake fluid is determined according to the distance between the vehicle and the preceding vehicle and ii) the brake is applied on the wheel based on the determined second fluid pressure;
a first sensor configured to detect the amount of the brake operation performed by the occupant;
a second sensor configured to detect the brake fluid pressure of the fluid pressure device, wherein the second sensor detects the first brake fluid pressure during the first control mode, and wherein the second sensor detects the second brake fluid pressure during the second control mode;
an electric power generator configured to provide regenerative torque that decelerates the vehicle upon deceleration of the vehicle via a power transmission path of the vehicle; and
a controller configured to:
during the first control mode, restrict the regenerative torque of the electric power generator based on an allowable deceleration rate set based on the amount of the brake operation performed by the occupant; and
during the second control mode, restrict the regenerative torque of the electric power generator based on an allowable deceleration rate set based on the second brake fluid pressure,
wherein, during the first control mode, the controller:
calculates a first allowable deceleration rate, as the allowable deceleration rate being an upper limit of a deceleration rate, based on the amount of the brake operation performed by the occupant; and
calculates a limit value based on the first allowable deceleration rate such that the regenerative torque of the electric power generator is restricted based on the limit value, and
wherein, during the second control mode, the controller:
calculates a second allowable deceleration rate, as the allowable deceleration rate being the upper limit of the deceleration rate, based on the second allowable deceleration rate; and
calculates the limit value based on the second allowable deceleration rate such that the regenerative torque of the electric power generator is restricted based on the limit value.

2. The vehicle control apparatus according to claim 1, wherein
the controller sets, when detecting the first control mode, the first allowable deceleration rate on the basis of the brake operation amount and on a basis of a first data group, and
the controller sets, when detecting the second control mode, the second allowable deceleration rate on the basis of the brake fluid pressure and on a basis of a second data group that is different from the first data group.

3. The vehicle control apparatus according to claim 2, further comprising:
a first work rate calculator configured to calculate a first deceleration work rate, the first deceleration work rate causing a deceleration rate upon the deceleration of the vehicle to reach the first allowable deceleration rate set for when detecting the first control mode or the second allowable deceleration rate set for when detecting the second control mode;
a second work rate calculator configured to calculate, on a basis of a traveling speed upon the deceleration of the vehicle, a second deceleration work rate, the second deceleration work rate corresponding to traveling resistance that decelerates the vehicle;
an upper limit work rate calculator configured to subtract the second deceleration work rate from the first deceleration work rate and to thereby calculate an upper limit work rate of the electric power generator; and
an upper limit torque calculator configured to calculate upper limit torque of the electric power generator on a basis of the upper limit work rate of the electric power generator,
wherein the controller is configured to control the regenerative torque of the electric power generator on a basis of the upper limit torque.

4. The vehicle control apparatus according to claim 3, further comprising:
a third work rate calculator configured to calculate a third deceleration work rate on a basis of a revolution speed of an engine of the vehicle, the third deceleration work rate corresponding to engine revolution resistance that decelerates the vehicle,
wherein the upper limit work rate calculator is configured to subtract the second deceleration work rate and the third deceleration work rate from the first deceleration work rate, and to thereby calculate the upper limit work rate of the electric power generator.

5. The vehicle control apparatus according to claim 2, wherein the controller is configured to switch the allowable deceleration rate to the second allowable deceleration rate when detecting the second control mode.

6. The vehicle control apparatus according to claim 5, wherein the controller is configured to switch from the second allowable deceleration rate to the first allowable deceleration rate when detecting the first control mode.

7. The vehicle control apparatus according to claim 2, wherein the controller is configured to switch from the first allowable deceleration rate to the second allowable deceleration rate when detecting the second control mode.

8. The vehicle control apparatus according to claim 1, wherein the controller sets, when detecting the first control mode, the first allowable deceleration rate on the basis of the brake operation amount and on a basis of a first data group, and the controller, when detecting the second control mode, converts the brake fluid pressure into the brake operation amount, and sets the second allowable deceleration rate on the basis of the converted brake operation amount and on the basis of the first data group.

9. The vehicle control apparatus according to claim 8, further comprising:
a first work rate calculator configured to calculate a first deceleration work rate, the first deceleration work rate causing a deceleration rate upon the deceleration of the vehicle to reach the first allowable deceleration rate set for when detecting the first control mode or the second allowable deceleration rate set for when detecting the second control mode;
a second work rate calculator configured to calculate, on a basis of a traveling speed upon the deceleration of the vehicle, a second deceleration work rate, the second deceleration work rate corresponding to traveling resistance that decelerates the vehicle;
an upper limit work rate calculator configured to subtract the second deceleration work rate from the first deceleration work rate and to thereby calculate an upper limit work rate of the electric power generator; and
an upper limit torque calculator configured to calculate upper limit torque of the electric power generator on a basis of the upper limit work rate of the electric power generator,
wherein the controller is configured to control the regenerative torque of the electric power generator on a basis of the upper limit torque.

10. The vehicle control apparatus according to claim 9, further comprising:
a third work rate calculator configured to calculate a third deceleration work rate on a basis of a revolution speed of an engine of the vehicle, the third deceleration work rate corresponding to engine revolution resistance that decelerates the vehicle,
wherein the upper limit work rate calculator is configured to subtract the second deceleration work rate and the third deceleration work rate from the first deceleration work rate, and to thereby calculate the upper limit work rate of the electric power generator.

11. The vehicle control apparatus according to claim 1, wherein
the vehicle control apparatus further comprises:
a first work rate calculator configured to calculate a first deceleration work rate, the first deceleration work rate causing a deceleration rate upon the deceleration of the vehicle to reach the first allowable deceleration rate set for when detecting the first control mode or the second allowable deceleration rate set for when detecting the second control mode;
a second work rate calculator configured to calculate, on a basis of a traveling speed upon the deceleration of the vehicle, a second deceleration work rate, the second deceleration work rate corresponding to traveling resistance that decelerates the vehicle;
an upper limit work rate calculator configured to subtract the second deceleration work rate from the first deceleration work rate and to thereby calculate an upper limit work rate of the electric power generator; and
an upper limit torque calculator configured to calculate upper limit torque of the electric power generator on a basis of the upper limit work rate of the electric power generator, and
the controller is configured to control the regenerative torque of the electric power generator on a basis of the upper limit torque.

12. The vehicle control apparatus according to claim 11, further comprising:
a third work rate calculator configured to calculate a third deceleration work rate on a basis of a revolution speed of an engine of the vehicle, the third deceleration work rate corresponding to engine revolution resistance that decelerates the vehicle,
wherein the upper limit work rate calculator is configured to subtract the second deceleration work rate and the third deceleration work rate from the first deceleration work rate, and to thereby calculate the upper limit work rate of the electric power generator.

13. A vehicle control apparatus for a vehicle, the vehicle control apparatus comprising:
a brake system that includes:
a brake operation device configured to be operated by an occupant of the vehicle;
a wheel braking device configured to apply brake on a wheel of the vehicle using a brake fluid; and
a fluid pressure device configured to provide a brake fluid pressure of the brake fluid to be supplied to the wheel braking device, wherein the brake system includes:
a first control mode in which the vehicle decelerates based on the brake operation performed by the occupant of the vehicle such that i) a first brake fluid pressure of the brake fluid is determined according to an amount of the brake operation by the occupant and ii) the brake is applied on the wheel based on the determined first brake fluid pressure; and
a second control mode in which the vehicle automatically decelerates based on a distance between the vehicle and a preceding vehicle and without the brake operation of the occupant such that i) a second brake fluid pressure of the brake fluid is determined according to the distance between the vehicle and the preceding vehicle and ii) the brake is applied on the wheel based on the determined second fluid pressure;
a first sensor configured to detect the amount of the brake operation performed by the occupant;
a second sensor configured to detect the brake fluid pressure of the fluid pressure device, wherein the second sensor detects the first brake fluid pressure during the first control mode, and wherein the second sensor detects the second brake fluid pressure during the second control mode;
an electric power generator configured to provide regenerative torque that decelerates the vehicle upon deceleration of the vehicle via a power transmission path of the vehicle;
a memory; and
a controller coupled with the memory, wherein the controller is configured to:
during the first control mode, restrict the regenerative torque of the electric power generator based on an allowable deceleration rate set based on the amount of the brake operation performed by the occupant; and
during the second control mode, restrict the regenerative torque of the electric power generator based on an allowable deceleration rate set based on the second brake fluid pressure, wherein, during the first control mode, the controller:
calculates a first allowable deceleration rate, as the allowable deceleration rate being an upper limit of a deceleration rate, based on the amount of the brake operation performed by the occupant; and calculates a limit value based on the first allowable deceleration rate such that the regenerative torque of the electric power generator is restricted based on the limit value, and wherein, during the second control mode, the controller:
calculates a second allowable deceleration rate, as the allowable deceleration rate being the upper limit of the deceleration rate, based on the second allowable deceleration rate; and calculates the limit value based on the second allowable deceleration rate such that the regenerative torque of the electric power generator is restricted based on the limit value.

* * * * *